United States Patent
McFarland

(10) Patent No.: US 11,186,377 B2
(45) Date of Patent: Nov. 30, 2021

(54) HIGH PRESSURE EVACUATION SLIDE WITH TRUSS-SHAPED SIDE RAILS

(71) Applicant: GOODRICH CORPORATION, Charlotte, NC (US)

(72) Inventor: Eric McFarland, Laveen, AZ (US)

(73) Assignee: Goodrich Corporation, Charlotte, NC (US)

( * ) Notice: Subject to any disclaimer, the term of this patent is extended or adjusted under 35 U.S.C. 154(b) by 219 days.

(21) Appl. No.: 16/276,115

(22) Filed: Feb. 14, 2019

(65) Prior Publication Data

US 2020/0262570 A1 Aug. 20, 2020

(51) Int. Cl.
*B64D 25/14* (2006.01)
(52) U.S. Cl.
CPC .................................... *B64D 25/14* (2013.01)
(58) Field of Classification Search
CPC ....................................................... B64D 25/14
See application file for complete search history.

(56) References Cited

U.S. PATENT DOCUMENTS

| | | | | |
|---|---|---|---|---|
| 3,845,920 A * | 11/1974 | Satterfield | ............... | B64D 25/14 244/137.2 |
| 4,846,422 A * | 7/1989 | Fisher | ................... | B64D 25/14 244/137.2 |
| 6,536,715 B1 * | 3/2003 | Moran | ................... | B64D 25/14 244/137.2 |
| 2011/0259668 A1 * | 10/2011 | Grainger | ............... | E01D 15/122 182/48 |
| 2018/0273191 A1 * | 9/2018 | Haynes | ................... | B64D 25/14 |
| 2019/0276156 A1 * | 9/2019 | Boyer | ....................... | B63C 9/23 |

* cited by examiner

*Primary Examiner* — Philip J Bonzell
*Assistant Examiner* — Tye William Abell
(74) *Attorney, Agent, or Firm* — Snell & Wilmer L.L.P.

(57) ABSTRACT

An evacuation slide may comprise a sliding surface extending from a head end of the evacuation slide to a toe end of the evacuation slide and a truss-shaped side rail located adjacent the sliding surface. An evacuation system may comprise the evacuation slide and a charge cylinder fluidly coupled to the truss-shaped side rail.

17 Claims, 2 Drawing Sheets

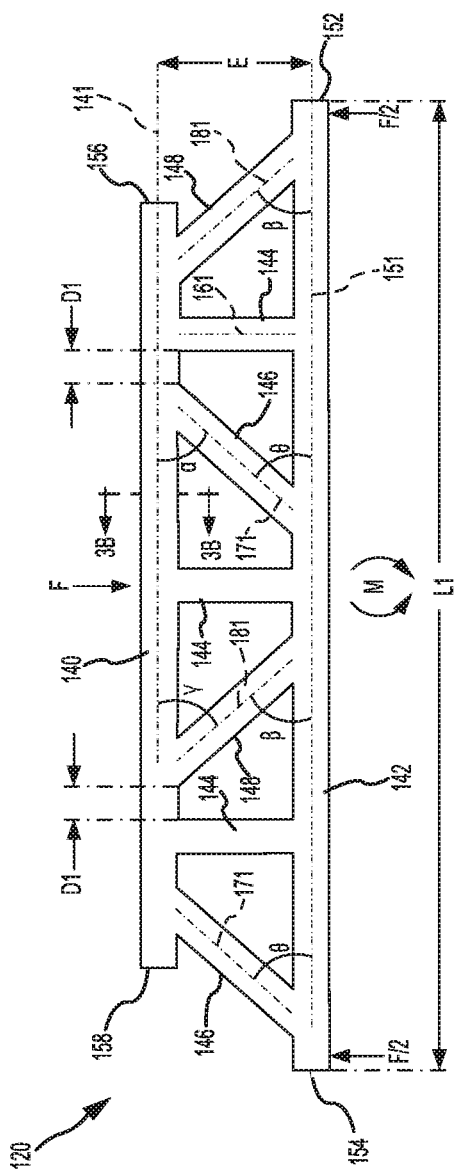
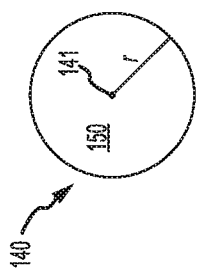
FIG.3A
FIG.3B

HIGH PRESSURE EVACUATION SLIDE WITH TRUSS-SHAPED SIDE RAILS

FIELD

The present disclosure relates to aircraft evacuation systems and, in particular, to evacuation slides having truss-shaped side rails.

BACKGROUND

Emergency evacuation systems may be used to exit an aircraft absent a jet way or other suitable means of egress for passengers. The evacuation systems generally include a slide that deploys from an aircraft fuselage or wing. The slides typically include a pair of inflatable side rails located at opposing sides of the sliding surface. Current side rail designs tend to include a first cylindrically-shaped tube stacked on a second cylindrically-shaped tube. The side rails tend to have a large radius, and may be associated with a large volume of low pressure gas for inflation. The bulk and size of the side rails may create variability in the way the slide unfolds during deployment, which in turn may cause inflation geometry discrepancies that can render the slide unusable.

SUMMARY

An evacuation slide is disclosed herein. In accordance with various embodiments, the evacuation slide may comprise a sliding surface extending from a head end to a toe end of the evacuation slide and a truss-shaped side rail located adjacent the sliding surface.

In various embodiments, the truss-shaped side rail may comprise an upper tube, a lower tube, and an orthogonal tube extending between the upper tube and the lower tube. The orthogonal tube may be generally orthogonal to the upper tube and the lower tube.

In various embodiments, the upper tube may be fluidly coupled to the lower tube. In various embodiments, the sliding surface may be located proximate the lower tube.

In various embodiments, the truss-shaped side rail may further comprise a first diagonal tube extending between the upper tube and the lower tube. The first diagonal tube may be oriented at an angle of between 30° and 60° relative to the lower tube. In various embodiments, the truss-shaped side rail may further comprise a second diagonal tube extending between the upper tube and the lower tube. The second diagonal tube may be oriented at an angle of between 30° and 60° relative to the lower tube.

In various embodiments, the truss-shaped side rail may comprise an upper tube, a lower tube, a first diagonal tube extending between the upper tube and the lower tube, and a second diagonal tube extending between the upper tube and the lower tube. The first diagonal tube may be oriented at a non-orthogonal angle relative to the lower tube. The second diagonal tube may be oriented at a non-orthogonal angle relative to the lower tube.

An evacuation system is also disclosed herein. In accordance with various embodiments, the evacuation system may comprise an evacuation slide comprising a first truss-shaped side rail and a charge cylinder fluidly coupled to the first truss-shaped side rail.

In various embodiments, the first truss-shaped side rail may comprise an upper tube, a lower tube, and an orthogonal tube extending between the upper tube and the lower tube. The orthogonal tube may be generally orthogonal to the upper tube and the lower tube.

In various embodiments, the first truss-shaped side rail may further comprise a first diagonal tube extending between the upper tube and the lower tube. The first diagonal tube may be oriented at an angle of between 30° and 60° relative to the lower tube.

In various embodiments, the evacuation slide may further comprise a second truss-shaped side rail and a slide surface extending between the first truss-shaped side rail and the second truss-shaped side rail. In various embodiments, the second truss-shaped side rail may be fluidly coupled to the first truss-shaped side rail.

In various embodiments, the evacuation slide may further comprise a transverse support tube extending between the first truss-shaped side rail and the second truss-shaped side rail.

In various embodiments, the first truss-shaped side rail may comprise an upper tube, a lower tube, a first diagonal tube extending between the upper tube and the lower tube, and a second diagonal tube extending between the upper tube and the lower tube. The first diagonal tube may be oriented at an angle of between 30° and 60° relative to the lower tube. The second diagonal tube may be oriented at an angle of between 30° and 60° relative to the lower tube.

A truss-shaped side rail for an inflatable slide is also disclosed herein. In accordance with various embodiments, the truss-shaped side rail may comprise an upper tube, a lower tube, and a first diagonal tube extending between the lower tube and the upper tube and oriented at a first non-orthogonal angle relative to the lower tube.

In various embodiments, a second diagonal tube may extend between the lower tube and the upper tube and may be oriented at a second non-orthogonal angle relative to the lower tube.

In various embodiments, the first non-orthogonal angle and the second non-orthogonal angle may each be between 30° and 60°.

In various embodiments, the first non-orthogonal angle and the second non-orthogonal angle may each be about 45°.

In various embodiments, an orthogonal tube may extend between the lower tube and the upper tube and may be oriented generally orthogonal to the upper tube and the lower tube. In various embodiments, the orthogonal tube may be located between the first diagonal tube and the second diagonal tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A illustrates a truss-shaped side rail of an evacuation slide, in accordance with various embodiments; and FIG. 3B illustrates a cross-section view of an inflatable tube of a side rail taken along the line 3B-3B in FIG. 3A, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity. As used herein, "proximate" refers to a direction towards or a location closer to a reference component.

Evacuation systems of the present disclosure may include inflatable slides having truss-shaped side rails. The truss-shaped side rails may allow for inflatable tubes having a smaller radius as compared to the inflatable tubes of traditional side rails. Truss-shaped side rails may be associated with use of less slide material and lower inflation gas mass as compared to larger diameter, non-truss side rails. The decrease in inflation gas may allow for smaller charged cylinders and/or may eliminate a need for air aspiration during inflation. Decreasing the amount of material and charge cylinder size and/or eliminating or reducing a number of aspirators tends to decrease a weight and storage envelope of the evacuation system.

Figure 1:
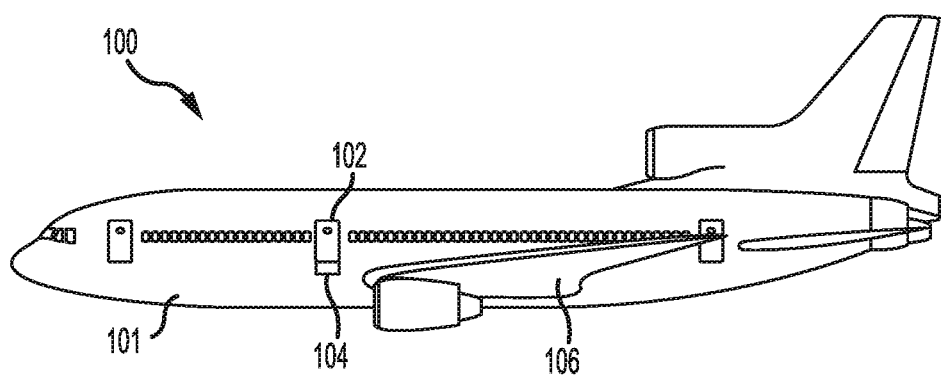
FIG. 1 illustrates an aircraft having an evacuation system, in accordance with various embodiments.

Referring now to FIG. 1, an aircraft 100 is shown. Aircraft 100 may include a fuselage 101 having plurality of exit doors, including an exit door 102. Aircraft 100 may include one or more evacuation systems positioned near a corresponding exit door. For example, aircraft 100 includes an evacuation system 104 positioned near exit door 102. In the event of an emergency, exit door 102 may be opened by a passenger or crew member of aircraft 100. In various embodiments, evacuation system 104 may deploy in response to exit door 102 being opened or in response to another action taken by a passenger or crew member such as depression of a button or actuation of a lever. While evacuation system 104 is disclosed as deploying from exit door 102, it is further contemplated and understood that evacuation system 104 may deploy from other locations; for example, evacuation system 104 may deploy from a wing 106 of aircraft 100.

Figure 2:
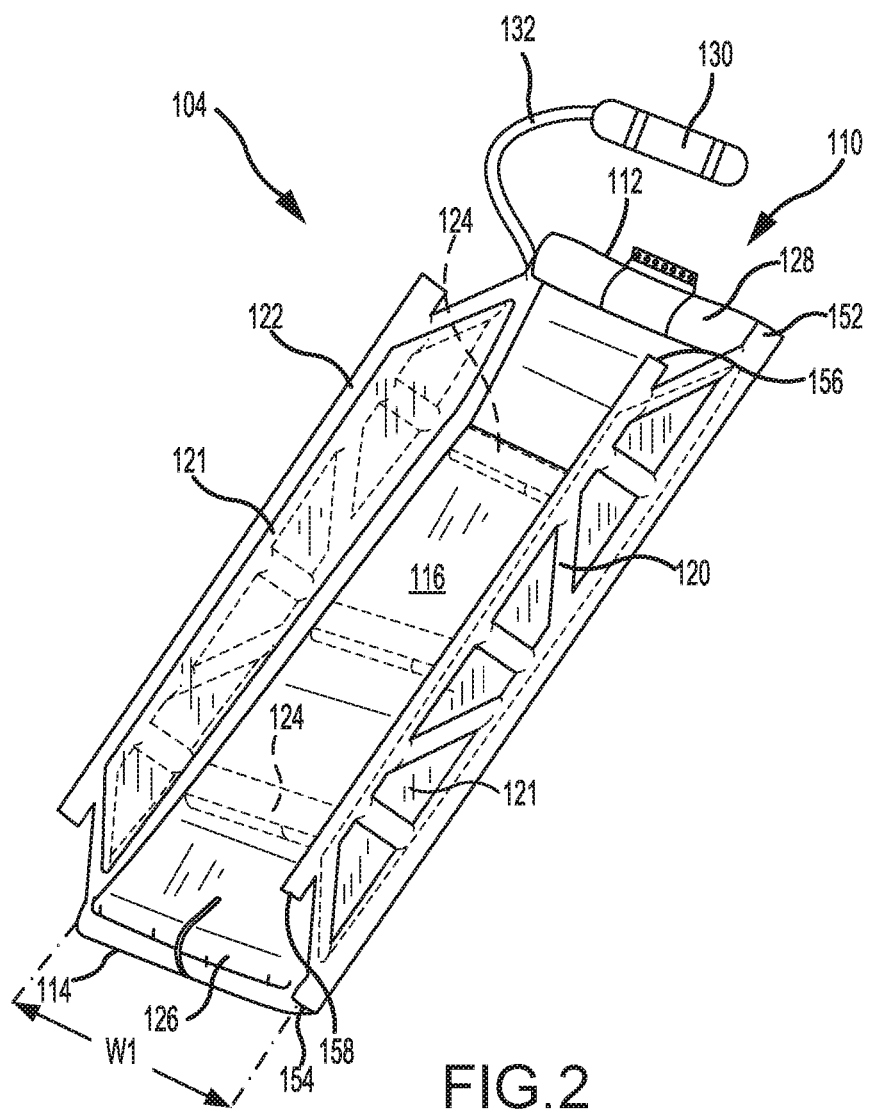
FIG. 2 illustrates a perspective view of an evacuation slide in a deployed position, in accordance with various embodiments.

With reference to FIG. 2, evacuation system 104 is illustrated, in accordance with various embodiments. Evacuation system 104 may comprise an evacuation slide 110. Evacuation slide 110 includes a head end 112 and a toe end 114. Toe end 114 is opposite head end 112. Head end 112 may be located proximate and/or coupled to an aircraft structure (e.g., to fuselage 101 proximate a door way of exit door 102, with momentary reference to FIG. 1). Upon deployments, toe end 114 extends toward and may contact an exit surface (e.g., the ground or a body of water). Evacuation slide 110 includes a sliding surface 116. Sliding surface 116 may extend from head end 112 to toe end 114. Upon deployment of evacuation slide 110, sliding surface 116 is oriented generally away from the exit surface. Evacuation slide 110 is illustrated as a single lane slide. However, evacuation slide 110 may comprise any number of lanes.

Evacuation slide 110 may comprise a pair of truss-shaped side rails, for example, first truss-shaped side rail 120 (referred to herein as first side rail 120) and second truss-shaped side rail 122 (referred to herein as second side rail 122). First side rail 120 and second side rail 122 are disposed on opposing sides of sliding surface 116. Stated differently, sliding surface 116 is adjacent to and extends between first side rail 120 and second side rail 122. In various embodiments, evacuation slide 110 may include one or more transverse support tube(s) 124. Transverse support tubes 124 may be located opposite sliding surface 116 and may extend between first side rail 120 and second side rail 122. In various embodiments, evacuation slide 110 may include a transverse toe end tube 126 located proximate toe end 114, and a transverse head end tube 128 located proximate head end 112. Transverse toe end tube 126 and transverse head end tube 128 may each extend between first side rail 120 and second side rail 122.

In various embodiments, first side rail 120 may be in fluid communication with second side rail 122. Stated differently, first side rail 120 may be fluidly coupled to second side rail 122. Transverse support tubes 124, transverse toe end tube 126, and transverse head end tube 128 may be fluidly coupled to first side rail 120 and second side rail 122. In this regard, first side rail 120, second side rail 122, transverse support tubes 124, transverse toe end tube 126, and transverse head end tube 128 may be part of one interconnected volume that fills with gas upon deployment of evacuation slide 110.

Evacuation system 104 may include a compressed fluid source, for example, charge cylinder 130. Charge cylinder 130 is in fluid communication with evacuation slide 110. A conduit 132 may fluidly couple charge cylinder 130 to an inflatable structure of evacuation slide 110. For example, conduit 132 may fluidly couple charge cylinder 130 to at least one of first side rail 120 or second side rail 122. Charge cylinder 130 is configured to deliver air and/or other gas into first side rail 120 and second side rail 122, upon deployment of evacuation slide 110.

With reference to FIG. 3A, a side view of first side rail 120 of evacuation slide 110 is illustrated. While FIG. 3A illustrates first side rail 120, it should be understood that second side rail 122, with momentary reference to FIG. 2, includes the elements and functionalities as described herein with respect to first side rail 120. In accordance with various embodiments, first side rail 120 includes a truss-shape. The truss-shape of first side rail 120 is formed by an upper tube 140, a lower tube 142, one or more orthogonal tube(s) 144, one or more first diagonal tube(s) 146, and one or more second diagonal tube(s) 148. Upper tube 140, lower tube 142, orthogonal tubes 144, first diagonal tubes 146, and second diagonal tubes 148 are fluidly coupled to one another. In various embodiments, upper tube 140, lower tube 142, orthogonal tubes 144, first diagonal tubes 146, and second diagonal tubes 148 each include a generally cylindrical shape with a generally circular cross-section.

With momentary combined reference to FIGS. 2 and 3A, in various embodiments, evacuation slide 110 may include one or more liner(s) 121 located over inboard areas of first side rail 120 and second side rail 122. As used in the previous context, "inboard areas" refers to portions of first side rail 120 and second side rail 122 that are oriented generally toward sliding surface 116. Liners 121 may comprise a netting or a solid fabric formed from, for example, nylon, ballistic nylon, polypropylene, polyester, cotton, or any other suitable material. Liners 121 may cover the open areas between orthogonal tubes 144 and first and second diagonal tubes 146, 148 to block or prevent slide occupants from passing through and/or getting entangled in the openings. Liners 121 may also provide a load transfer between the inflatable tubes attached thereto.

Referring now to FIG. 3B, a cross-section of upper tube 140 taken along the line 3B-3B in FIG. 3A is illustrated. While FIG. 3B illustrates a cross-section of upper tube 140, it should be understood that lower tube 142, orthogonal tubes 144, first diagonal tubes 146, and second diagonal tubes 148, with momentary reference to FIG. 3A, each include the elements and features as described herein with respect to upper tube 140. Upper tube 140 includes a generally circular cross-section having a radius r as measured from a center axis 141 of upper tube 140, wherein center axis 141 represents the imaginary axis, or point, from which the cross-sectional radius of upper tube 140 is measured. In various embodiments, r may be less 10.0 inches or less (25.4 centimeters (cm)). In various embodiments, r may be 5.0 inches or less (12.7 cm). In various embodiments, r may be 3.0 inches or less (7.6 cm). Upper tube 140 defines an internal volume 150. Internal volume 150 may be filled with gas upon deployment of evacuation slide 110.

With combined reference to FIG. 3A and FIG. 2, lower tube 142 includes a first end 152 and a second end 154 generally opposite first end 152. First end 152 may be located at head end 112 of evacuation slide 110. Second end 154 may be located at toe end 114 of evacuation slide 110.

In various embodiments, sliding surface 116 is located along lower tube 142 and extends from first end 152 of lower tube 142 to second end 154. For example, sliding surface 116 may be located proximate a center axis 151 of lower tube 142. Center axis 151 is an imaginary axis, or point, from which the cross-sectional radius of lower tube 142 is measured.

Upper tube 140 includes a first end 156 and a second end 158 generally opposite first end 156. First end 156 of upper tube 140 may be located proximate head end 112 of evacuation slide 110. Second end 158 of upper tube 140 may be located proximate toe end 114 of evacuation slide 110. In various embodiments, upper tube 140 is generally parallel to lower tube 142. As used in the previous context, "generally parallel" means ±10° from parallel.

Orthogonal tubes 144 are generally orthogonal to upper tube 140 and lower tube 142. For example, orthogonal tubes 144 are oriented such that a center axis 161 of each orthogonal tube 144 and is generally orthogonal to center axis 141 of upper tube 140 and to center axis 151 of lower tube 142. As used in the previous context, "generally orthogonal" means between 85° and 95°. Center axis 161 is an imaginary axis, or point, from which the cross-sectional radius of orthogonal tube 144 is measured.

First diagonal tubes 146 are oriented at non-orthogonal angles relative to upper tube 140 and lower tube 142. In various embodiments, first diagonal tubes 146 are oriented at a 45° angle relative to upper tube 140 and lower tube 142. For example, first diagonal tubes 146 may be oriented such that a center axis 171 of each first diagonal tube 146 is oriented at an angle alpha ($\alpha$) of about 45° relative to center axis 141 of upper tube 140 and at an angle theta ($\theta$) of about 45° relative to center axis 151 of lower tube 142. As used in the previous context, "about" means ±5°. In various embodiments, angles alpha ($\alpha$) and theta ($\theta$) may be between 20° and 75°. In various embodiments, angles alpha ($\alpha$) and theta ($\theta$) may be between 30° and 60°.

Second diagonal tubes 148 are oriented at non-orthogonal angles relative to upper tube 140 and lower tube 142. In various embodiments, second diagonal tubes 148 are oriented at a 45° angle relative to upper tube 140 and lower tube 142. For example, second diagonal tubes 148 may be oriented such that a center axis 181 of each second diagonal tube 148 is oriented at an angle beta ($\beta$) of about 45° relative to center axis 141 of upper tube 140 and at an angle gamma ($\gamma$) of about 45° relative to center axis 151 of lower tube 142. As used in the previous context, "about" means ±5°. In various embodiments, angles beta ($\beta$) and gamma ($\gamma$) may be between 20° and 75°. In various embodiments, angles beta ($\beta$) and gamma ($\gamma$) may be between 30° and 60°.

In various embodiments, first diagonal tubes 146 and second diagonal tubes 148 alternate along a length L1 of sliding surface 116. Length L1 of sliding surface 116 may be measured from first end 152 to second end 154 of lower tube 142. In various embodiments, an orthogonal tube 144 may be located between adjacent first and second diagonal tubes 146, 148. Stated differently, in various embodiments, two orthogonal tubes 144 and one first diagonal tube 146 may be located between each pair of second diagonal tubes 148, and two orthogonal tubes 144 and one second diagonal tube 148 may be located between each pair of first diagonal tubes 146. First and second diagonal tubes 146, 148 may be mirror images of one another about each orthogonal tube 144. For example, in various embodiments, the portion of first diagonal tube 146 proximate upper tube 140 is located closer to head end 112 of evacuation slide 110 as compared to the portion of first diagonal tube 146 located proximate lower tube 142, and the portion of second diagonal tube 148 proximate lower tube 142 is located closer to head end 112 of evacuation slide 110 as compared to the portion of second diagonal tube 148 located proximate upper tube 140.

The truss-shape of first and second side rails 120, 122 may allow the inflatable tubes of evacuation slide 110 (i.e., upper tube 140, lower tube 142, orthogonal tubes 144, first diagonal tubes 146, second diagonal tubes 148, transverse support tubes 124, transverse toe end tube 126, and transverse head end tube 128) to be formed having a smaller radii, as compared to evacuation slides having traditional, or non-truss-shaped, side rails. The below calculations illustrate a buckling limit calculation for an exemplary evacuation slide 110 having truss-shaped first and second side rails 120, 122 with upper tube 140, lower tube 142, orthogonal tubes 144, first diagonal tubes 146, second diagonal tubes 148, transverse support tubes 124, transverse toe end tube 126, and transverse head end tube 128 each having a diameter of 3.0 inches (7.6 cm) (i.e., a radius of 1.5 inches (3.8 cm)).

For example, the "buckling limit" of upper tube 140 (i.e., the moment at which upper tube 140 may fold or bend) may be determined using equations 1, 2, and 3 below:

$$F = M/E \qquad \text{EQ. 1}$$

$$F = P\pi r^2 \qquad \text{EQ. 2}$$

$$M = EP\pi r^2 \qquad \text{EQ. 3}$$

where F is the minimum load, applied by an occupant located at a midpoint of sliding surface 116 (i.e., halfway between first end 152 and second end 154 of lower tube 142), sufficient to cause evacuation slide 110 to buckle; M is the bending moment created by force F at the midpoint of sliding surface 116; E is a height of first side rail 120 as measured between center axis 141 of upper tube 140 and center axis 151 of lower tube 142; P is the chamber pressure of upper tube 140; and r is the radius of upper tube 140.

A chamber pressure P sustainable by upper tube 140 may be calculated comparatively using a chamber pressure and radius of a traditional, non-truss shaped side rail formed from the same materials as truss-shaped first and second side rails 120, 122. For example, the chamber pressure P sustainable by upper tube 140 may be defined by equation 4 below:

$$P_1 r_1 = P_2 r_2 \qquad \text{EQ. 4}$$

where $P_1$ is a sustainable chamber pressure of a current non-truss shaped side rail; $r_1$ is a radius of the current non-truss side rail; $P_2$ is the chamber pressure sustainable by upper tube 140 and $r_2$ is the radius of upper tube 140. Assuming a $P_1$ of 3.4 pounds per square inch gauge (psig) (23.4 kilopascal (kPa)), an $r_1$ of 11 inches (27.9 cm), and an $r_2$ of 1.5 inches (3.8 cm), upper tube 140 may sustain a chamber pressure $P_2$ of 25 psig (172.4 kPa). Thus, using EQ. 3, and assuming an r of 1.5 inches (3.8 cm), a P of 25 psig (172.4 kPa), an E of 60 inches (152.4 cm), and 2 truss-shaped side rails per evacuation slide, upper tube 140 may have a bending moment, or buckling limit, M of approximately 21,200 inch-pounds (in-lbs) (2,395. Newton Meters (N·m)).

The bending moment generated by an occupant at the midpoint of sliding surface 116 may be calculated using equation 5 below:

$$M_e = 1/2 F \frac{L1}{2} \qquad \text{EQ. 5}$$

where $M_e$ is the bending moment generated by the occupant; F is the load generated by the occupant; L1 is the length of sliding surface 116 (i.e., the distance between first end 152 and second end 154 of lower tube 142). The bending moment M from EQ. 3 may be compared to the bending moment $M_e$ from EQ. 5 to determine if the buckling limit of first side rail 120 is capable of withstanding the bending moment generated by an occupant load at the sliding surface midpoint. For example, an occupant weighing 170 pounds (lbs) (77.1 kilograms) and located at the midpoint of an evacuation slide 110 having a length L1 of 240 inches (609.6 cm) would generate a bending moment $M_e$ of 10,200 in-lbs (1152 N·m). As shown above, a 3.0 inch (7.62 cm) diameter upper tube 140 at a height (E) of 60.0 inches (152.4 cm) may withstand a bending moment (M) of up to approximately 21,200 in-lbs (2,395 N·m) and could thus support a 170 lb occupant without buckling.

The truss-shape of first and second side rails 120, 122 may also be associated with less material, as compared to evacuation slides having traditional, non-truss shaped side rails. For example, the amount of fabric associated with forming the inflatable tubes of an evacuation slide may be calculated using equation 6 below:

$$A = LD\pi \qquad \text{EQ. 6}$$

where A is the surface area of the inflatable tubes; L is the total length of the inflatable tubes; and D is the diameter of the inflatable tubes. A traditional, non-truss shaped evacuation slide, having a sliding surface length of 240 inches (609.6 cm) and two side rails each comprised of an upper cylindrical tube having a 22.0 inch (55.9 cm) diameter stacked on a lower cylindrical tube having a 22.0 inch (55.9 cm) diameter, has a side rail surface area of 66,316.0 square inches ($in^2$ (42.8 square meters ($m^2$)). In this regard, greater than 66,000.0 $in^2$ (42.6 $m^2$) of material may be associated with just the side rails (i.e., excluding any transverse support tubes, sliding surface material, etc.) of a traditional, non-trussed shaped evacuation slide. In comparison, an evacuation slide 110 having an inflatable tube diameter D of 3.0 inches (7.6 cm), a length L1 of 240.0 inches (609.6 cm), a height E of 60.0 inches (152.4), a width W1 as measured between first side rail 120 and second side rail 122 of 48.0 inches (121.9 cm), three transverse support tubes 124, one transverse toe end tube 126, one transverse head end tube 128, and a distance D1 as measured between orthogonal tubes 144 and each adjacent first or second diagonal tube 146, 148 of 3.0 inches (7.6 cm) may have a total inflatable tube length L of approximately 2,376.0 inches (6,035.0 cm) and an inflatable tube surface area A of approximately 22,381.0 $in^2$ (14.4 $m^2$). As used in the previous context "approximately" means ±10%. The decreased inflatable tube surface area of A of evacuation slide 110 may be associated with less material, which tends to decrease a weight of evacuation slide 110, as compared to traditional, non-truss shaped evacuation slides.

The truss-shape of first and second side rails 120, 122 may also be associated with less inflatable volume, and thus a smaller charged cylinder as compared with evacuation slides having larger diameter, non-truss side rails. For example, an evacuation slide 110 having an inflatable tube diameter D of 3.0 inches (7.6 cm), a length L1 of 240.0 inches (609.6 cm), a height E of 60.0 inches (152.4 cm), a width W1 of 48.0 inches (121.9 cm), three transverse support tubes 124, one transverse toe end tube 126, one transverse head end tube 128, and a distance D1 of 3.0 inches (7.6 cm) may have an inflatable volume of approximately 7.7 cubic feet ($ft^3$) (0.22 cubic meters) and may be associated with a 70.0° F. (21.1° C.) gas requirement of approximately 26.2 standard cubic feet, which may be provided by a charge cylinder 130 having a volume of approximately 150.0 $inch^3$ (2,458.1 $cm^3$). As used in the previous context, "approximately" means ±10%. For comparison, a traditional slide having a sliding surface length of 240 inches (609.6 cm), a sliding surface width of 48.0 inches (121.9 cm), side rails comprised of an upper cylindrical tube stack on a lower cylindrical tube, and an inflatable tube radius of 11.0 inches (27.9 cm) may be inflated by a charge cylinder having a volume of 300.0 $inch^3$ (4,916.1 $cm^3$). The decreased charge cylinder volume associated with inflating evacuation slide 110 having truss-shaped side rails may reduce the weight and storage envelope of evacuation system 104.

The above exemplary calculations assume the radii of upper tube 140, lower tube 142, orthogonal tubes 144, first diagonal tubes 146, and second diagonal tubes 148 are equal to one another. In various embodiments, the radius of upper tube 140 may be equal to the radius of lower tube 142 and the radii of orthogonal tubes 144, first diagonal tubes 146, and/or second diagonal tubes 148 may be less than the radii of upper and lower tubes 140, 142.

Evacuation system 104, including an evacuation slide 110 with truss-shaped first and second side rails 120, 122, may have a decreased amount of material and smaller volume charge cylinder as compared to evacuation systems having slides of similar length, but with larger diameter, non-truss shaped side rails. In this regard, evacuation systems including evacuation slide 110 tend to have a decreased weight and may be associated with a smaller storage envelope.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
   a sliding surface extending from a head end to a toe end of the evacuation slide; and
   a truss-shaped side rail located adjacent the sliding surface, the truss-shaped side rail comprising:
      an upper tube including a first end located at the head end of the evacuation slide and a second end located at the toe end of the evacuation slide;
      a lower tube extending from the head end to the toe end;
      a plurality of diagonal tubes located along a length of the sliding surface and extending between the upper tube and the lower tube, wherein each diagonal tube of the plurality of diagonal tubes is oriented at a non-orthogonal angle relative to the lower tube, and wherein each diagonal tube of the plurality of diagonal tubes has a cylindrical shape with a circular cross-section, and
      an orthogonal tube extending between the upper tube and the lower tube, wherein the orthogonal tube is generally orthogonal to the upper tube and the lower tube, and wherein the orthogonal tube is located between a first diagonal tube of the plurality of diagonal tubes and a second diagonal tube of the plurality of diagonal tubes, and wherein an upper end of each of the first diagonal tube, the orthogonal tube, and the second diagonal tube intersects a bottom surface of the upper tube, the bottom surface of the upper tube being oriented toward the lower tube, and wherein the upper end of the first diagonal tube and the upper end of the second diagonal tube are each spaced apart from the upper end of the orthogonal tube along the bottom surface of the upper tube.

2. The evacuation slide of claim 1, further comprising a liner located over an inboard area of the truss-shaped side rail.

3. The evacuation slide of claim 2, wherein the sliding surface is located proximate the lower tube.

4. The evacuation slide of claim 1, wherein the upper tube is fluidly coupled to the lower tube.

5. The evacuation slide of claim 4, wherein the first diagonal tube of the plurality of diagonal tubes is oriented at an angle of between 30° and 60° relative to the lower tube, and wherein a first upper portion of the first diagonal tube is located closer to the head end of the evacuation slide as compared to a first lower portion of the first diagonal tube, the first upper portion of the first diagonal tube being closer to the upper tube as compared to the first lower portion of the first diagonal tube.

6. The evacuation slide of claim 5, wherein the second diagonal tube is oriented at an angle of between 30° and 60° relative to the lower tube, and wherein a second upper portion of the second diagonal tube is located closer to the toe end of the evacuation slide as compared to a second lower portion of the second diagonal tube, the second upper portion of the second diagonal tube being closer to the upper tube as compared to the second lower portion of the second diagonal tube.

7. An evacuation system, comprising:
   an evacuation slide comprising a first truss-shaped side rail, the first truss-shaped side rail including:
      an upper tube including a first end located a head end of the evacuation slide and second end located at a toe end of the evacuation slide;

a lower tube extending from the head end of the evacuation slide to the toe end of the evacuation slide;

a plurality of diagonal tubes extending between the upper tube and the lower tube, wherein each diagonal tube of the plurality of diagonal tubes is oriented at a non-orthogonal angle relative to the lower tube, and wherein each diagonal tube of the plurality of diagonal tubes has a cylindrical shape with a circular cross-section; and a plurality of orthogonal tubes extending between the upper tube and the lower tube, wherein each orthogonal tube of the plurality of orthogonal tubes is generally orthogonal to the upper tube and the lower tube, and wherein each orthogonal tube is located between a pair of diagonal tubes of the plurality of diagonal tubes, each pair of diagonal tubes including a first diagonal tube of the plurality of diagonal tubes and a second diagonal tube of the plurality of diagonal tubes, and wherein an upper end of each first diagonal tube, orthogonal tube, and second diagonal tube intersects a bottom surface of the upper tube, the bottom surface of the upper tube being oriented toward the lower tube, and wherein the upper end of each first diagonal tube and the upper end of the each second diagonal tube are spaced apart along the bottom surface of the upper tube from the upper end of the orthogonal tube located between the first diagonal tube and the second diagonal tube; and a charge cylinder fluidly coupled to the first truss-shaped side rail.

8. The evacuation system of claim 7, wherein the second diagonal tube of each pair of diagonal tubes is oriented at an angle of between 30° and 60° relative to the lower tube, and wherein a second upper portion of the second diagonal tube of each pair of diagonal tubes is located closer to the toe end of the evacuation slide as compared to a second lower portion of the second diagonal tube of each pair of diagonal tubes, the second upper portion of the second diagonal tube of each pair of diagonal tubes being closer to the upper tube as compared to the second lower portion of the second diagonal tube of each pair of diagonal tubes.

9. The evacuation system of claim 7, wherein the first diagonal tube of each pair of diagonal tubes is oriented at an angle of between 30° and 60° relative to the lower tube, and wherein a first upper portion of the first diagonal tube of each pair of diagonal tubes is located closer to the head end of the evacuation slide as compared to a first lower portion of the first diagonal tube of each pair of diagonal tubes, the first upper portion of the first diagonal tube of each pair of diagonal tubes being closer to the upper tube as compared to the first lower portion of the first diagonal tube of each pair of diagonal tubes.

10. The evacuation system of claim 9, wherein the evacuation slide further comprises:

a second truss-shaped side rail; and a slide surface extending between the first truss-shaped side rail and the second truss- shaped side rail.

11. The evacuation system of claim 10, wherein the second truss-shaped side rail is fluidly coupled to the first truss-shaped side rail.

12. A truss-shaped side rail for an inflatable slide, comprising:

an upper tube configured to extend from a head end of the inflatable slide to a toe end of the inflatable slide;

a lower tube configured to extend from the head end of the inflatable slide to the toe end of the inflatable slide;

a plurality of diagonal tubes extending between the lower tube and the upper tube, wherein each diagonal tube of the plurality of diagonal tubes is oriented at a non-orthogonal angle relative to the lower tube; and a plurality of orthogonal tubes extending between the upper tube and the lower tube, wherein each orthogonal tube is generally orthogonal to the upper tube and the lower tube, and wherein each orthogonal tube is located between a pair of diagonal tubes of the plurality of diagonal tubes, each pair of diagonal tubes including a first diagonal tube of the plurality of diagonal tubes and a second diagonal tube of the plurality of diagonal tubes, and wherein an upper end of each first diagonal tube, orthogonal tube, and second diagonal tube intersects a bottom surface of the upper tube, the bottom surface of the upper tube being oriented toward the lower tube, and wherein the upper end of each first diagonal tube and the upper end of the each second diagonal tube are spaced apart along the bottom surface of the upper tube from the upper end of the orthogonal tube located between the first diagonal tube and the second diagonal tube.

13. The truss-shaped side rail of claim 12, wherein:

the first diagonal tube of each pair of diagonal tubes has a first upper portion and a first lower portion, wherein the first upper portion is located closer to the upper tube as compared to the first lower portion, and wherein the first upper portion is located closer to a first end of the upper tube as compared to the first lower portion; and the second diagonal tube of each pair of diagonal tubes has a second upper portion and a second lower portion, wherein the second upper portion is located closer to the upper tube as compared to the second lower portion, and wherein the second upper portion is located closer to a second end of the upper tube as compared to the second lower portion.

14. The truss-shaped side rail of claim 13, wherein the first diagonal tube and the second diagonal tube of each pair of diagonal tubes are each oriented at an angle of between 30° and 60° relative to the lower tube.

15. The truss-shaped side rail of claim 13, wherein the first diagonal tube and the second diagonal tube of each pair of diagonal tubes are each oriented at an angle of about 45° relative to the lower tube.

16. The truss-shaped side rail of claim 13, wherein a diameter of the first diagonal tube and the second diagonal tube of each pair of diagonal tubes is equal to a diameter of the lower tube.

17. The truss-shaped side rail of claim 13, wherein a diameter of the first diagonal tube and the second diagonal tube of each pair of diagonal tubes is less than a diameter of the lower tube.

* * * * *